INVENTOR.
James R. Ford
Marshall D. Bear
BY

INVENTOR.
James R. Ford
Marshall D. Bear

United States Patent Office 3,140,487
Patented July 7, 1964

3,140,487
SLANT RANGE POSITION AND VELOCITY
DETERMINING SYSTEM
James R. Ford, La Mesa, and Marshall D. Bear, San Diego, Calif., assignors to Cubic Corporation, San Diego, Calif., a corporation of California
Filed July 13, 1959, Ser. No. 826,596
9 Claims. (Cl. 343—8)

The present invention relates to a slant range position and velocity determining system, and more particularly, to a greatly simplified electronic system capable of determining both slant range position and velocity of a transponder-carrying target vehicle.

One technique of determining the slant range distance to a target vehicle is found in the co-pending U.S. application for patent and having the same assignee as the present application, entitled "A Sequenced Spatial Coordinate Determining System," Serial No. 737,446, filed May 23, 1958, to Robert V. Werner, Walter J. Zable and William J. Thompson, now U.S. Patent No. 3,111,665, issued November 19, 1963. According to the disclosed technique, a series of so-termed range signals, from 491.76 kc. to .1921 kc. are simultaneously modulated on a carrier signal which is then transmitted to a transponder located in the target vehicle. The range signals are extracted in the transponder, remodulated on a different carrier signal frequency, and retransmitted to the ground station. Slant range may then be determined by measuring phase shifts undergone by the series of range signals in their round trip to the transponder and back.

As was also disclosed, the determination of the spatial coordinate position of the target vehicle required three separate slant range measuring systems, whose relative ground-based positions were accurately known, followed by a computational procedure for converting the slant range measurement into spatial coordinate form.

Although accurate positional data is of basic importance in evaluating the performance and performing real-time guidance of a target vehicle, the determination of its continuous velocity is another parameter of fundamental importance, as will be readily appreciated, particularly for fuel cut-off and guidance control. The system of the above-noted application for patent did not furnish slant range velocity information per se, although the information existed in the rotational velocity of the output slant range distance dials in its servo readout unit. Such velocity information is many times too coarse and inaccurate to be of any particular use for the evaluation and control purposes, as noted.

Slant range velocity information can, in general, be determined most readily, and to the generally needed accuracy, by observing the frequency shift between the transmitted transponder carrier signal and its frequency measured at the ground station, caused by the well-known Doppler Effect. Such a measurement, of course, requires a predetermined knowledge of the precise transponder carrier frequency, measured at the transponder, in order that any frequency shift at the ground can be measured. This, in general, is difficult to obtain. For example, any drifts in the transponder carrier signal oscillator would reflect at the ground as Doppler shift with erroneous velocity data being recorded as a result. The size and weight of electronic equipment needed for obtaining highly stable and precise transponder carrier signal frequencies is inconsistent with the equipment carrying capabilities of normal airborne vehicles.

Another technique capable of acquiring slant range velocity information is by employing so-termed coherency techniques, wherein the transponder circuitry retransmits a carrier signal whose frequency always bears a precise mathematical relationship with the received carrier signal from the ground. With this relationship established, the ground station can determine the Doppler shift in the received transponder carrier signal, since it knows its own carrier signal frequency. The technique, however, requires electronic equipment of considerable complexity at both the ground station and in the transponder, as may be seen by reference to another co-pending U.S. application for patent, having a common assignee with the present application, entitled "An Ionospheric Refraction Correction Technique," Serial No. 768,997, filed October 22, 1958 to Robert V. Werner, now U.S. Patent No. 3,068,469 issued December 11, 1962, in which coherency techniques are employed.

The present system offers a technique by which Doppler or velocity information is available to high accuracy and yet offers a considerable electronic equipment savings in both the transponder and ground station when compared to that required for mechanizing the coherency technique, as noted above. In particular, a carrier signal modulated by the series of range signals is received at the transponder, where it is mixed with a local transponder oscillator signal, and the resulting upper and lower sideband mixing results are retransmitted to the ground station. Both sideband signals are then separately amplified and the original carrier signal component eliminated in each, by separate mixing actions, leaving only the transponder oscillator signal in the two sideband signals, each sigal differing in frequency from the actual transponder signal owing to the Doppler shift incurred in the ground and transponder carrier signals by reason of the transponder slant range velocity. These two signals are then mixed, with the result that the sum frequency contains the Doppler shift frequency, which is applied to a velocity readout unit for indicating the frequency thereof, and therefore gives the transponder slant range velocity. The other mixing product, representing the difference frequency, is divided by two to yield the exact transponder oscillator frequency, and it is then mixed with one of the amplified sideband signals, as received directly from the transponder, to produce the master carrier signal, but modified in frequency by a portion of the Doppler shift. This signal is then detected to provide the series of phase shifted data range signals, which are applied to a servo readout unit which derives the target slant range position. In addition, this detection provides a D.-C. level corresponding to the Doppler shift term in this sideband signal, the D.-C. level being passed to a polarity indicating device which gives, by its sign, whether the slant range velocity reading given by the velocity readout unit is positive or negative.

The basic distance-measuring system thus described is immune to reasonable variations of the ground station and transponder oscillator signal frequencies owing to the signal cancellation techniques employed. Not only does this characteristic lend itself to the employment of less critical, simpler and cheaper circuits, but a deliberate variation in the ground station transmitter frequency may be made for countermeasure purposes. In a pair of embodiments, two different techniques are illustrated for deliberately varying the oscillator signal over reasonable limits, in order to prevent normal jamming by an external signal frequency, to which a fixed or single frequency system would be susceptible.

The basic single ground station and transponder system above described is extended in another embodiment to include a single ground station, termed the master, a single transponder, and the two ground-based slave stations which serve to receive the originally produced master station signal after its passage through the transponder, and then relay the modified signal back through the transponder for receipt at the master station. By their action, then, the two slave stations act, in a sense, as fixed transponders, which communicate continuously with the master station through the vehicle-carried transponder. The slave stations, of considerably less complexity than the slave stations noted in the prior-mentioned application for patent, effectively take the upper and lower sideband signals from the transponder-modified master station signal and produce a single output signal which differs from the other carrier signals by a predetermined fraction of the transponder oscillator signal. This is done by extracting at the slave station the transponder signal from the received signals and then modifying one of the input signals by a divided-down fraction thereof. The two signals thus produced by the two slaves result in individual upper and lower sideband signals at the transponder, which are then passed into separate receivers at the master station. Each receiver serves to produce output position data based on the total distance between the master-to-transponder-to-slave, and additionally produces velocity information based on the sum of the slant range velocity of the transponder relative to the master and of the transponder to the slave. Additional, simple, computational techniques may then be employed at the master station to obtain slant range position and velocity information from each slave to the transponder. This, in turn, yields sufficient information to determine the spatial coordinate position and velocity of the vehicle.

The techniques thus far described are extended in a final embodiment such that the basic master and two slave station complexes above described may be extended to simultaneously service a plurality of target vehicles, only two being shown. In this embodiment, the second transponder employs a different local oscillator signal than the first transponder, and the slave station circuitry must be duplicated for the new transponder frequencies employed. The master station will contain a new receiver for furnishing readout information of the second transponder range and velocity from it and additional receivers for each of the duplicated slave station circuits corresponding to the new transponder. In all other respects, the detailed circuitry is the same as described.

It is, accordingly, the principal object of the present invention to provide a greatly simplified electronic system for providing slant range velocity and position information of a moving target from a ground station.

Another object of the present invention is to provide an electronic system for determining the slant range velocity to a transponder-carrying target vehicle wherein a single ground-transmitted carrier signal is returned as two sideband signals from the transponder which, in turn, are reduced at the ground by a series of mixing actions to a single signal whose frequency corresponds to the slant range velocity of the target vehicle.

Still another object of the present invention is to provide an electronic system for determining the slant range velocity of a transponder-carrying target vehicle wherein a ground-transmitted signal is received by the transponder and returned as a pair of signals, each frequency-related to the received ground-transmitted signal, the ground station acting on the two returned signals in conjunction with its own transmitted signal to produce a first signal whose frequency indicates the slant range velocity of said target vehicle and a second signal whose polarity represents the sign of the slant range velocity indicated by said first signal.

A further object of the present invention is to provide an electronic system for determining the slant range and slant range velocity to a transponder-carrying target vehicle by transmitting a carrier signal modulated by a series of range signals to the transponder, which returns the received signal as a pair of range signal modulated carrier signals which, in turn, are mixed for producing a signal whose frequency corresponds to the slant range velocity and one which is demodulated for deriving the series of range signals but phase shifted an amount corresponding to the transponder slant range.

A still further object of the present invention is to provide an electronic system capable of producing information of the spatial coordinate velocity of a transponder-carrying moving target vehicle by transmitting a single signal from a master station to the transponder, which transmits a pair of sideband signals in response thereto which are received by the master and each of two slave stations, each of the slave stations operating on the pair of received signals from the transponder to retransmit a single signal which is received by the transponder and retransmitted as a pair of sideband signals for receipt by the master station, which, in turn, operates in all of said received pairs of sideband signals for determining respective slant range velocities of the target vehicle from the master and each of the slave stations.

A further object of the present invention is to provide an electronic system capable of producing slant range velocity and position information of a transponder-carrying moving target vehicle by transmitting a carrier signal modulated by a series of range signals from a master station to the transponder, which retransmits a pair of range signal modulated carrier signals in response thereto, the pair of retransmitted signals being received by the master and each of two slave stations, each of the slave stations operating on its pair of received signals to retransmit a single range signal modulated carrier signal which, in turn, is received by the transponder and retransmitted as a pair of range signal modulated carrier signals for receipt by the master station, which, in turn, operates on all of said received pairs of range signal modulated carrier signals for producing slant range position information of the target vehicle from the master and each of the two slave stations based on the range signal phase shifts and slant range velocity information of the target vehicle from the master and each of the two slave stations based on the carrier signal frequencies as received at the master station.

A still further object of the present invention is to provide an electronic system capable of producing information of the spatial coordinate velocity of at least a pair of transponder-carrying moving target vehicles by transmitting a single signal from a master station to the pair of transponders, each of which transmits two sideband signals in response thereto, which, in turn, are received by the master and each of two slave stations, each of the slave stations operating on the two received signals from each of the pair of transponders to retransmit a single signal which is received by each of the pair of transponders and retransmitted as a pair of sideband signals for receipt by the master station, which, in turn, operates in all of said received pairs of sideband signals for determining respective slant range velocities of the pair of target vehicles from the master and each of the slave stations.

Other objects, features and attendant advantages of the present invention will become more apparent to those skilled in the art as the following disclosure is set forth, including a detailed description of a preferred embodiment of the invention as illustrated in the accompanying sheets of drawings, in which:

Figure 1:
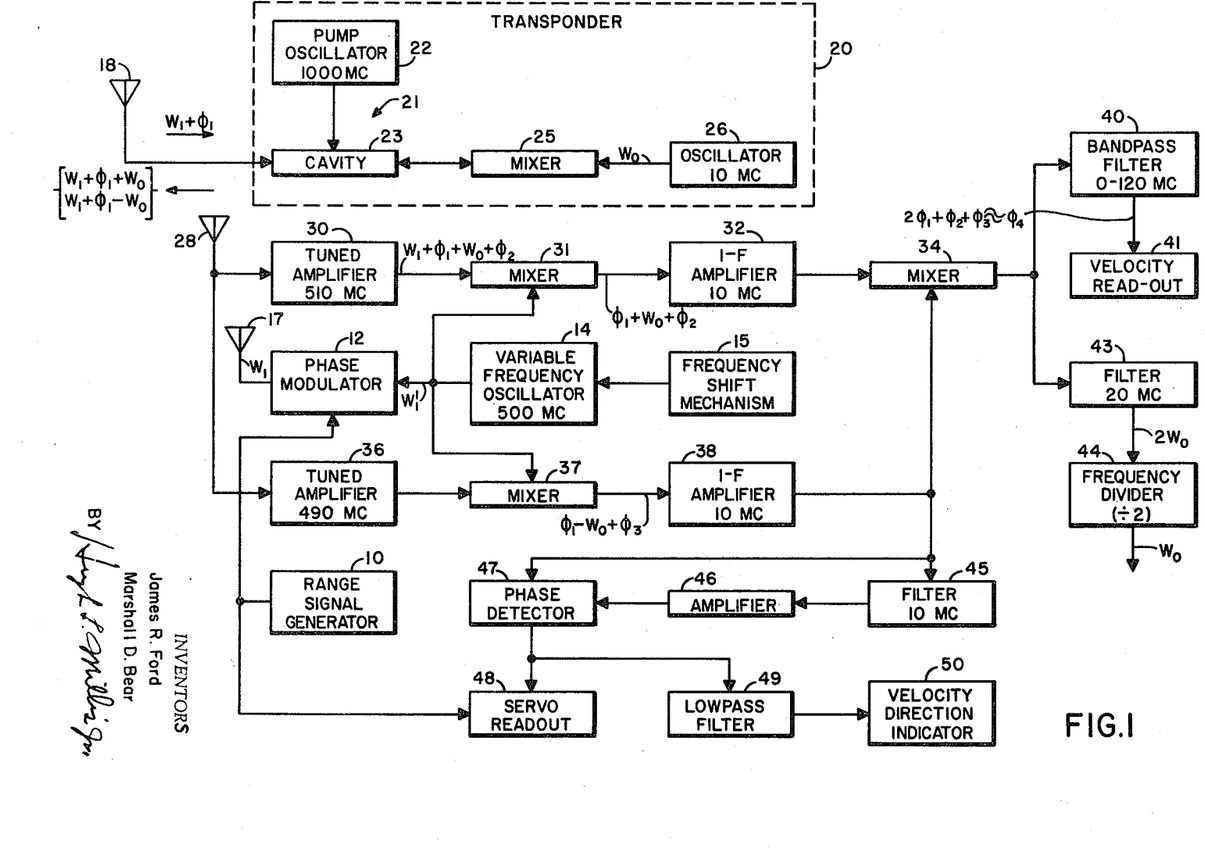
FIGURE 1 is a block diagrammatic representation of a slant range and slant range velocity measuring system according to the present invention.

Referring now to the drawings wherein the same elements are given identical numerical designations throughout, there is illustrated in FIGURE 1 the primary embodiment of the present invention, in which a single ground station is employed with a single airborne transponder. In particular, the output signals of a range signal generator 10 and a variable frequency oscillator 14 are applied to the two respective input terminals of a phase modulator 12. The phase modulator 12 output signal is applied to a transmitting antenna 17, which, in turn, radiates it for receipt by an airborne antenna 18, carried by the airborne target vehicle. Antenna 18 is coupled to a transponder, indicated by 20, also carried by the target vehicle.

In particular, the signal received by antenna 18 is coupled into a bidirectional parametric amplifier, generally indicated at 21, comprising a cavity 23 excited by a pump oscillator 22 which produces, for example, an output signal frequency of 1000 mc. Cavity 23 is coupled to a mixer 25 which, in turn, receives the output signal produced by an oscillator 26, which may be, for example, of 10-mc. in frequency.

Transponder antenna 18 radiates a return signal which is received by a ground station receiving antenna 28, coupled to the input terminal of each of amplifiers 30 and 36, tuned to respective center frequencies of 510 mc. and 490 mc. The output signals of amplifier 30 and oscillator 14 are applied to the two input terminals of a mixer 31, whose output signal, in turn, is amplified by an I-F amplifier 32 and applied to one input terminal of another mixer 34. The amplifier 36 and oscillator 14 output signals are applied to the two respective input terminals of another mixer 37, whose output signal is amplified by another I-F amplifier 38 and applied to the other input terminal of mixer 34.

The mixer 34 output signal is applied through a bandpass filter 40, having, for example, a 0–120-kc. range, to a velocity readout device, indicated generally at 41. The mixer 34 signal is also passed through a tuned filter 43, having a center frequency of about 20 mc., to a frequency divider 44. The output signal of divider 44 is not further employed in this FIGURE 1 embodiment, but will be used in the FIGURE 5 and the FIGURE 6 embodiments. The output signal of I-F amplifier 38 is passed directly to one input terminal of a phase detector 47, and is also passed to the other input terminal of detector 47 after being passed serially through a 10-mc. filter 45, preferably of the crystal variety, and an amplifier 46. The output signal of detector 47 in turn is applied to one input terminal of a servo readout device indicated at 48, and, additionally, is passed through a low-pass filter 49 to a velocity direction readout device, indicated at 50. Finally, the range signals produced by signal generator 10 are applied to the other input terminal of servo readout 48.

In considering the operation of the FIGURE 1 circuitry, the primary purpose of this electronic system, as noted earlier, is to determine slant range and slant range velocity between a ground station and a target vehicle. The slant range measurement is accomplished, in brief, by transmitting a series of so-termed range signals of increasingly longer wavelengths and accurately measuring the phase shift undergone by each in its travel between the ground station and transponder and return, since the incurred phase delay will be a direct function of the total distance traveled, and hence slant range. "Range signals," as used herein, are intended to refer generally to the *interrogating signals*, whos phase shift is proportional to the distance to the target. The term "range signal" is used to distinguish the interrogating signals from, for example, the carrier signals, which are at substantially higher frequencies and upon which are modulated the range signals. The interrogating, or range signals have a frequency chosen to provide unambiguous range information up to a maximum certain value. Higher frequencies are employed to yield the desired accuracy and additional frequencies, lying between the highest and the lowest, are selected to give continuous, unambiguous steps between the highest and lowest frequencies. In the above mentioned Werner patent, five interrogating signal frequencies were chosen and denominated according to Table I, set forth below.

*Table I*

| Range | Range Signal Frequency, kc. | λ in Feet | λ/4 |
|---|---|---|---|
| Very Fine | 491.76 | 2,000 | 500 |
| Fine | 61.470 | 16,000 | 4,000 |
| Intermediate | 7.68375 | 128,000 | 32,000 |
| Coarse | 1.9209 | 512,000 | 128,000 |
| Very Coarse | .192094 | 5,120,000 | 1,280,000 |

As will be observed by inspection of Table I, the five interrogating signal frequencies, later termed range or range modulation signals, are harmonically related to one another. The Fine frequency is one-eighth (⅛) the Very Fine, the Intermediate is one-eighth (⅛) the Fine, the Coarse is one-fourth (¼) the Intermediate, and the Very Coarse is one-tenth (⅒) the Coarse. As will be seen later, it is possible to attain a simplified range signal generating system by employing harmonically-related interrogating signals, and maintain all frequencies to extreme accuracy, which is, of course a systems requirement for achieving precise range measurement.

Accordingly, range signal generator 10 may be similar to that shown and described in the prior-noted application for patent, Serial Number 737,446, and, for example, may include a crystal oscillator whose frequency is appropriately counted down by a series of binary counting stages. Then, preselected frequencies may be tapped off from the binary counting chain, and each filtered to produce a corresponding sine wave. The sine wave signals may then be linearly mixed and the resulting signal frequency modulated on a carrier signal.

In continuing this description of the FIGURE 1 circuitry operation, assume for the present that oscillator 14 is producing a steady or constant 500-mc. output signal, designated $\omega_1'$. Phase modulator 12 acts to phase-modulate the linearly mixed series of range signals, produced by generator 10, and the resultant phase-modulated signal is transmitted via the ground station transmitting antenna 17 to the transponder antenna 18.

In the figure, $\omega_1'$ is employed to represent the original, unmodulated oscillator 14 output signal, while $\omega_1$ is used to denote it when modulated by the series of range signals. Since one function of the circuitry, according to the present invention, is to also provide slant range velocity of the target vehicle, the Doppler frequency shift in the carrier signal is continuously measured both in magnitude and sign. Accordingly, this Doppler frequency offset, as produced by slant range velocity in the various carrier signals, is indicated by Greek alphabetical designations following each carrier signal. As will be appreciated, the magnitude of the frequency shift in each case will be a function of the carrier signal frequency and the slant range velocity of the transponder. Accordingly, the ground transmitted signal frequency of $\omega_1$ will be modified by $\phi_1$, due to the target motion, and hence will enter the transponder at a frequency of $\omega_1 + \phi_1$.

From antenna 18, the received signal is passed through parametric amplifier 21, where it is amplified, and applied to mixer 25, which mixes it with the oscillator 26 output signal, which may have, by way of example, a 10-mc. frequency, and is designated $\omega_0$. The upper and lower sideband mixing results, having $\omega_1 + \phi_1 + \omega_0$ and $\omega_1'+\phi_1-\omega_0$ frequencies, respectively, are reamplified by parametric amplifier 21, and passed to antenna 18 for reradiation to the ground station.

Parametric amplifier 21 may, in detail, comprise any one of several circuit configurations, as known in the art. As will be appreciated, parametric amplifiers have, during the last several years, been extensively investigated for application in the ultra-high-frequency range, although their principles of operation have been known for a considerable length of time. For one embodiment, a pump oscillator, producing a signal of approximately twice the frequency of an applied signal, in conjunction with a non-linear inductance or capacitance, will produce bidirectional amplification of the applied signal. Thus, the incoming signal from antenna 18 will be amplified as it goes into mixer 25, with the resulting upper and lower sidebands resulting from the mixing action being reamplified within cavity 23 on its path back to antenna 18. A non-linear diode element would be employed in cavity 23, at the point of mixing between the pump signal and incoming and outgoing signals, for obtaining the stated amplification. An article on parametric amplifiers, entitled "Masers and Parametric Amplifiers," by Hubert Heffner, appears on pages 33 through 40 of the magazine entitled The Microwave Journal, volume 2, Number 3 of March 1959. In the same issue, an advertisement appears on page 13 of a commercially-available parametric amplifier which would operate successfully in the transponder, as described.

The transponder radiated signals undergo another Doppler frequency shift, again owing to the vehicle motion, as denoted by $\phi_2$ for the upper sideband signal and $\phi_3$ for the lower sideband signal. The signals, as received on ground antenna 28, are coupled into upper and lower sideband channels, beginning with amplifiers 30 and 36, respectively. In particular, tuned amplifier 30 is center tuned to 510 mc. for passing the received upper sideband signal of the basic $\omega_1+\omega_0$ frequency, while amplifier 36 is tuned to 490 mc. for passing the lower sideband signal of the basic $\omega_1-\omega_0$ frequency.

Mixers 31 and 37 serve to remove the $\omega_1'$ signal component from the upper and lower sideband signals by normal mixing action, and the difference signal frequencies obtained appear on their respective output terminals. Accordingly, the output signal of mixer 31 has a $\phi_1+\omega_0+\phi_2$ frequency, while the output signal of mixer 37 has a $\phi_1-\omega_0+\phi_3$ frequency. It should be observed that the data range signals, that is the range signals originally modulated on the carrier signal but phase delayed an amount corresponding to twice the slant range distance of the transponder, will still appear as a frequency modulation component in the amplifiers 32 and 38 output signals. This occurs since the unmodulated carrier signal $\omega_1'$ was applied to each of mixers 31 and 37, rather than the modulated $\omega_1$ signal.

I-F amplifiers 32 and 38 may be identical and may be center tuned for the 10-mc. transponder oscillator frequency $\omega_0$. The two amplified signals from these amplifiers are then mixed by mixer 34 with the various mixing components being thereby produced on the mixer 34 output terminals. Bandpass filter 40, owing to its relatively low cut-off frequency point, will pass the sum of the Doppler frequencies, or $2\phi_1+\phi_2+\phi_3$, out of the mixer 34 output signal frequency components to readout 41.

The $\phi_2+\phi_3$ components may be treated as $2\phi_1$ without introduction of undue error, hence the frequency of the signal passed by filter 40 may be considered as $4\phi_1$, or four times the Doppler frequency shift experienced by the $\omega_1$ signal in contacting the moving target vehicle.

Velocity readout 41 may be any one of several different types of frequency indicating devices. For example, it may comprise a tuned circuit having a reasonably linear slope with frequency over the 0 to 120-kc. range, followed by a rectifier which rectifies the applied signal to form a D.-C. signal whose magnitude corresponds to the applied signal frequency at its point of operation on the tuned circuit. A voltmeter may then be employed to indicate the magnitude of the rectified D.-C. potential. The scale calibration of the voltmeter may be established by the voltmeter and tuned circuit characteristics, the units desired for slant range velocity, etc.

On the other hand, velocity readout 41 may comprise a frequency discriminator whose output signal is coupled to a voltmeter whose calibration is based on the frequency discriminator characteristics. It will also be appreciated that the 120-kc. figure, chosen as the upper bandpass limit of filter 40, will, in practice, be determined by the maximum anticipated slant range velocity of the target vehicle to be tracked, and hence may be modified from the figure given, in accordance with the velocity characteristics of the particular target craft.

It will also be appreciated that the velocity readout information presented by readout 41 will comprise velocity magnitude only and will not present the sense or sign of velocity, that is whether it is positive or negative, in turn denoting whether the target vehicle is approaching or receding from the ground station. The sign of velocity is given by another portion of the FIGURE 1 circuitry, as will be described shortly.

Filter 43, tuned to 20 mc., will serve to pass the frequency difference obtained by the mixer 34 action, or $2\omega_0$. Frequency divider 44, which may, for example, be a free-running oscillator locked on to the filter 43 output signal at one-half the frequency thereof, will, accordingly, produce an output signal having the original transponder frequency, $\omega_0$. As noted earlier, this $\omega_0$ signal is required in the FIGURES 5 and 6 embodiments.

Crystal filter 45 filters out the range data signals appearing frequency modulated on the output signal of I-F amplifier 38, and the resulting filtered signal is applied to detector 47 as a correlation reference. Accordingly, detector 47 will detect the series of range signals in the amplifier 38 signal, and the resulting demodulated signals will be applied to servo 48 for readout purposes.

Filter 45 will also act to shift the phase of the amplifier 38 output signal ahead or behind as determined by whether the Doppler offset terms $\varnothing_1+\varnothing_3$ shift the 10-mc. value above or below, respectively, its nominal 10-mc. value. Accordingly, phase detector 47 will produce a corresponding negative or positive output D.-C. signal level depending on the direction of signal phase shift produced by filter 45.

Low-pass filter 49 serves to eliminate all data range signals appearing in the output signal of detector 47, thereby passing only the D.-C. level, corresponding to the direction of the $\varnothing_1+\varnothing_3$ Doppler shift to readout 50. Velocity direction indicator 50 may be a simple center-zero D.-C. voltmeter capable of indicating positive and negative polarity input values. A resulting positive or negative reading, then, will serve to indicate the sign or direction of the slant range velocity produced by readout 41.

Finally, as will be understood from the operation given for the system described in the above referred to application for patent, Serial Number 737,446, the input data range signals are passed into a series of corresponding channels in readout 48, where their phase differences with the original range signals produced by generator 10 are selectively determined and an over-all reading of slant range obtained.

The present system, as shown and described, represents a considerable advance in certain aspects over corresponding systems shown in the previously referred to applications for patent, Serial Numbers 737,446 and 768,997. In the first place, the present system has available and provides slant range velocity information of the target vehicle motion, contrast with the capabilities of the system disclosed in the first-mentioned application for patent. In that system, the ground-transmitted carrier signal and the transponder return carrier signal were uncorrelated, that is they were taken from two independent frequency sources. Accordingly, the ground station, with no knowledge of the instantaneous transponder carrier signal frequency, was unable to determine the carrier signal frequency shift, and hence slant range velocity.

In the second referred to application for patent, the transponder carrier and ground station carrier signals were coherent, that is the transponder carrier signal was maintained at a predetermined frequency relationship with the ground-transmitted signal. Hence, carrier frequency shift information was available, although not specifically utilized in the device covered by the application for patent, hence making it possible to determine slant range velocity, if desired. However, the technique employed for maintaining the transponder carrier signal coherent at a predetermined frequency relationship with the received ground-transmitted signal required highly complex electronic circuitry, including such individual circuits as frequency multipliers, modulators, phase discriminators, compensating amplifiers, etc. It is accordingly apparent that the present device provides velocity information with a greatly simplified transponder circuitry. Also, the ground station circuitry of the present system, associated with carrier signal generation and transmission, is greatly simplified over that required in the ground station found in this last-noted application for patent, particularly with respect to the portion employed for generating carrier signals.

Another notable improvement offered by the present circuitry is the fact that the ground-transmitted carrier signal, as produced by oscillator 14, may be varied or may vary over certain predetermined limits without in any way affecting the described operation of the system. Also, the transponder oscillator 26 signal $\omega_0$ may also drift or vary in frequency within reason without in any way affecting the accuracy of the position or velocity information obtained. In particular, the amount of permissible $\omega_1'$ and $\omega_0$ variations will be determined by the bandwidths of tuned amplifiers 30 and 36, as any deviations within the center-tuned portion have no effect on the system's operation.

The ability of the ground carrier signal $\omega_1$ to be varied over prescribed limits, as noted, without affecting the accuracy of the output data, may be made use of for countermeasure purposes, and a deliberate, preferably random, frequency variation made in its signal. This, in turn, will minimize or eliminate the possibility of an external source jamming the operating relationship between the transponder and ground station. The $\omega_1$ frequency shift ability is provided by frequency shift mechanism 15, shown schematically in FIGURE 1, with two more specific embodiments being illustrated in FIGURES 2a and 2b.

Figure 2:
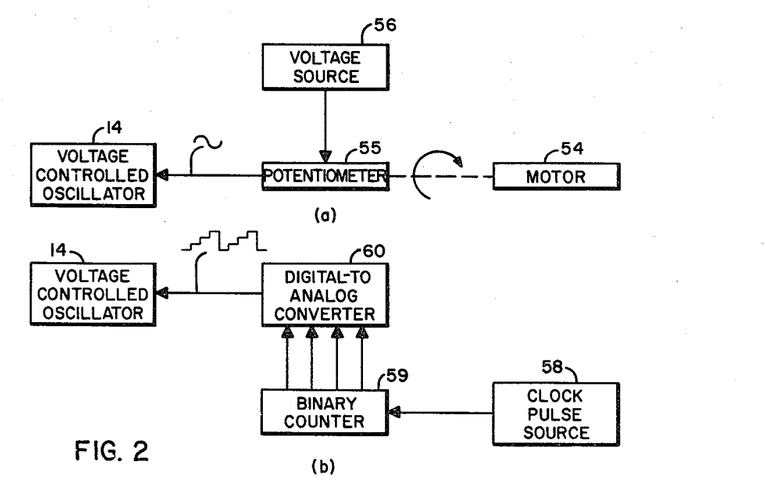
FIGURES 2a and 2b are block diagrammatic representations of two typical circuits capable of varying the oscillator frequency in the FIGURE 1 embodiment.

For example, as indicated in FIGURE 2a, the shaft of a continuously rotating motor 54 is coupled to the movable arm of a potentiometer 55. A voltage source 56 is coupled across potentiometer 55 with the potential picked off by the movable arm being applied to a voltage-controlled oscillator 14. Oscillator 14 may be, for example, a crystal-controlled oscillator having a capacitive diode associated with its tuned input circuit, the capacitance of the diode being a function of the magnitude of an applied potential. If the output potential from potentiometer 55 is applied across this diode, then the resonant point of the crystal will be determined by the capacitance of the diode and accordingly produce an output signal frequency corresponding thereto. As will be appreciated by those skilled in the art, numerous other types of variable frequency oscillators, whose frequency is a function of the value of an applied potential, may be employed. Potentiometer 55 may be of any continuous variety and will impart to $\omega_1'$ a variable frequency pattern determined by its resistance-versus-shaft-position characteristics.

Another type of frequency shift mechanism is illustrated in FIGURE 2b, wherein a clock pulse source 58 signal is applied to a binary counter 59 whose individual stages are, in turn, coupled to the input terminals of an analog-to-digital converter, indicated at 60. The output signal from converter 60 is applied to voltage-controlled oscillator 14. Here binary counter 59, which may be, for example, of two stages, continuously counts the pulses produced by source 58 and hence overflows at periodic intervals. Each count existing in counter 59, between the appearances of clock pulses, will be converted into a corresponding analog potential value by converter 60. This analog potential, in turn, will control the output signal frequency of oscillator 14. This is illustrated by the stair-step potential waveform shown associated with the output conductor of converter 60.

One restriction on the oscillator 14 frequency shift will be readily observed. That is, if variable frequency oscillator 14 is shifted too rapidly in frequency, then the return signal from the transponder will at any instant have a different, basic carrier signal frequency from the $\omega_1'$ signal then being produced and the resulting difference frequency will be indistinguishable from a Doppler shift. Accordingly, any $\omega_1'$ variations should be relatively slow compared to the time taken for its round trip to the transponder.

Figure 3:
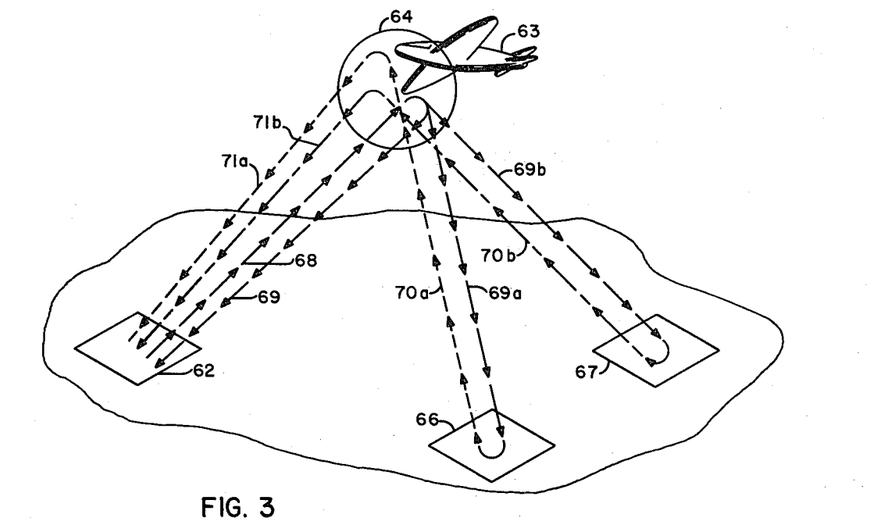
FIGURE 3 is a pictorial representation of the signal relationship existing between a master and two associated slave stations through a target vehicle transponder.

As will be appreciated, a single FIGURE 1 ground station will acquire only slant range information of the target vehicle position. Accordingly, in order to locate the target vehicle in spatial coordinate form, three separate and independent slant range measurements are required. In FIGURE 3 is indicated how an, as termed, master station, of the type shown in FIGURE 1, may be employed with a pair of, as termed, slave stations, to acquire sufficient information to locate the target vehicle in spatial coordinates. In this arrangement, the master station at 62 transmits a range signal modulated carrier signal, whose wave path is indicated at 68, intercepting the target transponder, indicated by a circle 64, and is returned as upper and lower sideband carrier signal frequencies on a return path 69. Two identical slave stations are shown at 66 and 67, a typical one being shown in detail in the following FIGURE 4. Station 66 receives, by way of path 69a, the upper and lower sideband return signals produced by the transponder, in turn formed from the transmitted master station signal. In the same way, the other slave station 67 receives via path 69b the same transponder signals. The path 69a signal, received by slave 66, is modified by the slave's circuitry, in a manner to be shortly shown, and is returned, as shown at 70a to the transponder, where it is again transformed and retransmitted at 71a for receipt by the master. In the same way, slave station 67 modifies its received signal at 69b, to return a signal, at 70b, to the transponder, where it is again transformed by the transponder operation and is retransmitted at 71b to master station 62.

In summary, then, in this extension of the present invention, the master station transmits a single signal at 68, receives it back at 69, and also simultaneously receives return signals from each of slaves 66 and 67. In this respect, then, slave stations 66 and 67 act merely as signal relay stations similar to the transponder, and the range signal information relayed thereby, will as will be apparent, include slant range distance of the master station to the transponder in addition to slant range distance of the slaves measured from the transponder. Since the relative ground locations of the master and two slave stations will be precisely known, it is apparent that sufficient information is available at the master station to enable the spatial coordinate location of the target vehicle 63 to be determined by computational procedures.

Figure 4:
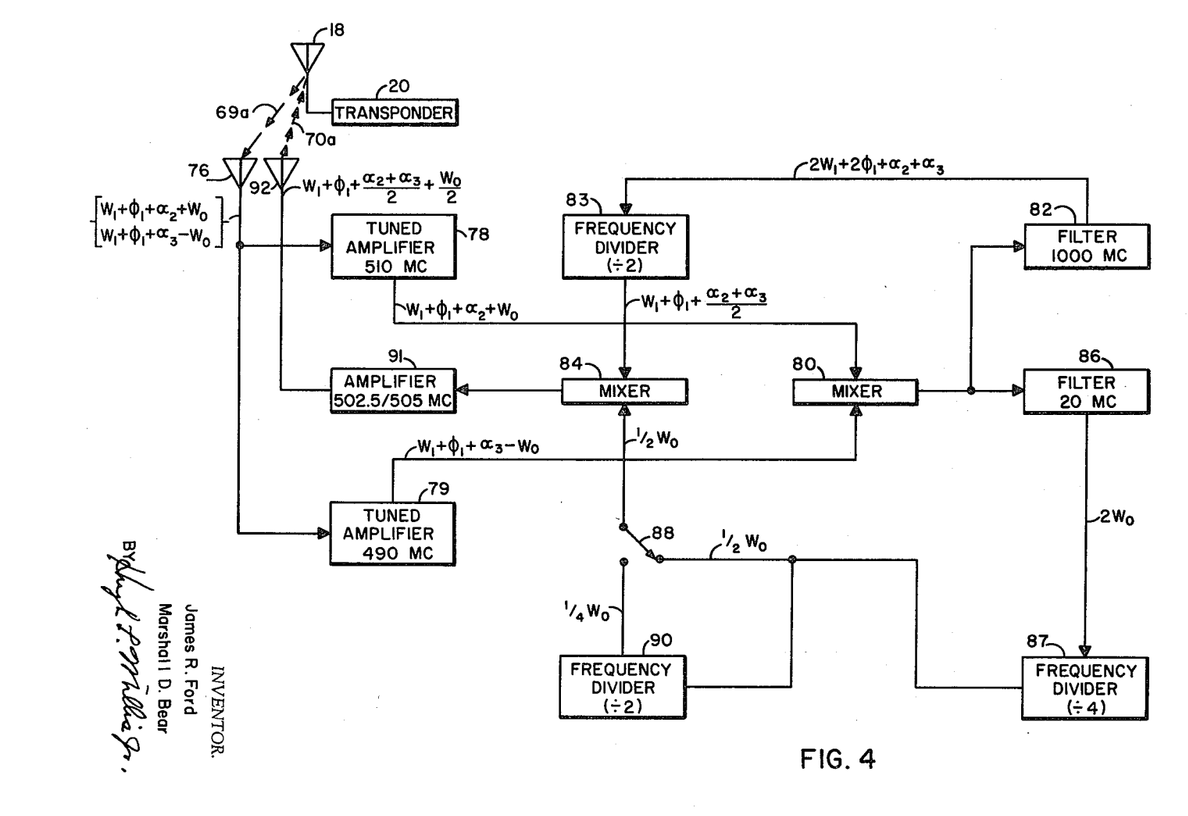
FIGURE 4 is a block diagrammatic representation of a typical slave station.

Referring now to FIGURE 4, there is illustrated a typical slave station, such as indicated at 66 and 67 in FIGURE 3. The upper and lower sideband transponder signals are received on an input antenna 76 and are amplified by a respective pair of tuned amplifiers 78 and 79, and applied to the two input terminals of a mixer 80. The output signal of mixer 80 is filtered by a 1000-mc. filter 82, divided in frequency by a scale-of-two frequency divider 83, and applied to one input terminal of another mixer 84. The output signal of mixer 80 is also passed through a 20-mc. filter 86 to the input terminal of a scale-of-four frequency divider 87, whose output signal is applied to one fixed switch point of a switch 88 and additionally passed through another scale-of-two frequency divider 90 to the other fixed switch point of switch 88. The movable switch arm of switch 88 is coupled to the other input terminal of mixer 84. The output signal of mixer 84 is amplified by an amplifier 91 and passed to a transmitting antenna 92.

In operation, each slave station will receive the transponder relayed master station signal, which will be similar to the signal received by the master station antenna in FIGURE 1 except that its upper and lower sideband frequencies will, as indicated in the figure, be modified by $\alpha_2$ and $\alpha_3$ amounts, respectively, owing to the slant range velocity of transponder 20 relative to the particular slave station. Amplifiers 78 and 79 are tuned to the $\omega_1+\omega_0$ and $\omega_1-\omega_0$ basic carrier signal frequencies of the upper and lower sidebands, and will selectively amplify these two respective signal frequencies. Filter 82, tuned to 1000 mc., will pass the sum frequency, or $2\omega_1+2\phi_1+\alpha_2+\alpha_3$, resulting from the action of mixer 80. Divider 83 acts to divide this frequency in two, with the result that a signal, having the frequency $$\omega_1 + \phi_1 + \frac{\alpha_2 + \alpha_3}{2}$$

is applied to one input terminal of mixer 84.

On the other hand, filter 86 is tuned to twice the transponder oscillator frequency, $2\alpha_0$, or 20 mc., and will pass the difference frequency coming from the mixer 80 action, or $2\omega_0$. This $2\omega_0$ frequency will be divided four times in frequency by frequency divider 87, with the result that a $\frac{1}{2}\omega_0$ frequency will be applied to the upper switch point of switch 88. Frequency divider 90 acts to divide the $\frac{1}{2}\omega_0$ signal in two, with the result that a $\frac{1}{4}\omega_0$ signal frequency is applied to the lower contact point of switch 88.

It is herein assumed that the two slave stations 66 and 67 in FIGURE 3 may each be identical to the circuitry shown in FIGURE 4. However, switch 88 will be thrown to opposite switch contact positions in the two slave stations in order that $\frac{1}{2}\omega_0$ will be applied to mixer 84 in one slave station, say station 66, while $\frac{1}{4}\omega_0$ will be applied to mixer 84 in the other slave station 67. In this way, as will be later understood, the master station receiver portion will be able to distinguish between the two respective slave return signals and acquire separate and distinct readout information, taken by them of the target vehicle's position and velocity.

Assuming switch 88 to be in its up position, as shown, then $\frac{1}{2}\omega_0$ will be applied to mixer 84, and the resulting sum signal will be amplified by selective amplifier 91, assumed tuned to 505 mc., or $\omega_1+\frac{1}{2}\omega_0$, with the result that the signal $$\omega_1 + \phi_1 + \frac{\alpha_2 + \alpha_3}{2} + \frac{\omega_0}{2}$$

as indicated, will be retransmitted by slave station transmitting antenna 92 through path 70a to the transponder 20 and from there back to the master station, as previously indicated in FIGURE 3. If switch 88 were thrown to its lower contact position, as it will be for the other slave station 67, then amplifier 91 should be tuned to a basic frequency of $\omega_1+\frac{1}{4}\omega_0$, or 502.5 mc., in order to handle the resulting sum frequency component produced by mixer 84.

Figure 5:
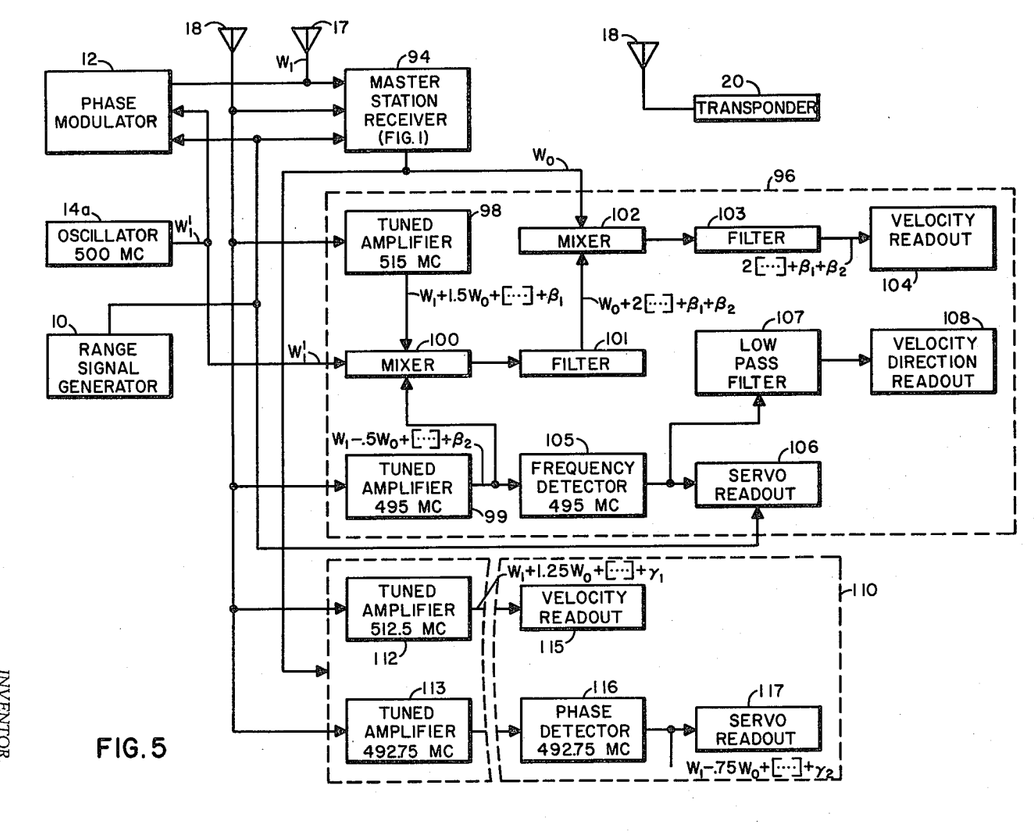
FIGURE 5 is a block diagrammatic representation, with some blocks shown broken away, of the FIGURE 1 circuit additions required for adding slave stations of the type shown in FIGURE 4.

In FIGURE 5 is shown the FIGURE 1 circuitry additions necessary at the master station for acquiring slant range position and velocity readings from each of the two slave station return signals. In this figure, the master station receiver, as previously shown in FIGURE 1, is indicated within block 94, with phase modulator 12, oscillator 14a and range signal generator 10 being shown external to the receiver. The slave station 66 readout unit located at the master station is indicated in dotted block 96 and, in particular, includes a pair of tuned amplifiers 98 and 99, each being coupled to receiving antenna 18. Their output signals, along with the output signal of oscillator 14a, herein being indicated as a fixed frequency source, in contrast to variable frequency oscillator 14 in FIGURE 1, are coupled to the three respective input terminals of a mixer 100. The output signal of mixer 100 is applied through a filter 101 to one input terminal of another mixer 102, the other input terminal of mixer 102 receiving the $\omega_0$ signal generated, as previously shown, in master station receiver 94. The output signal of mixer 102 is passed through another filter 103 to the input terminal of a velocity readout unit 104.

The output signal of amplifier 99 is additionally passed through a frequency detector 105 to one input terminal of a servo readout unit 106, similar to that described for servo readout 48 in the master station. The output signal of range signal generator 10 is similarly applied to the other input terminal of readout 106. The output signal of detector 105 is additionally passed through a low-pass filter 107 to a velocity direction readout unit 108.

Finally, the remaining portion of the system, required for slave readout 67, is indicated, partially only, in block 110, for the purpose of showing the different frequencies involved. In particular, the signal received from the transponder on receiving antenna 18 is applied to the two input terminals of tuned amplifiers 112 and 113, tuned to 512.5 mc. and 492.75 mc., respectively, both within unit 110. Finally, a velocity readout unit 115, a phase detector 116, and a servo readout 117 are indicated for completing the showing of this readout, which, as noted above, may be similar in all other respects to the one shown in detail in read-out unit 96.

In considering the operation of the FIGURE 5 circuitry, it will be appreciated that the master station receiver unit 94 will operate identically to the FIGURE 1 circuitry, as previously described. In considering the operation of the added receiver portion 96, it is first necessary to establish the transponder 20 action on the return signal 70a generated by slave station 66.

First of all, since the slave carrier signal frequency is $\omega_1+0.5\omega_0$, sum and difference frequencies produced by the mixing action with $\omega_0$ within the transponder will result in $\omega_1+1.5\omega_0$ and $\omega_1-0.5\omega_0$ being retransmitted as the respective upper and lower basic carrier signals, respectively, arriving at receiver 96.

The Doppler signal offset of the upper and lower sideband signals is indicated in the figure as [ . . . . ]+$\beta_1$ and [ . . . . ]+$\beta_2$, respectively, where $\beta_1$ and $\beta_2$, respectively refer to the Doppler shifts in the two noted signals in traveling from the transponder to the ground receiver. The [ . . . . ] in the figure indicates previous Doppler offset effects on the signal frequencies which will be equal to $$\left[\phi_1 + \frac{\alpha_2+\alpha_3}{2} + \theta_1\right]$$

in each case, where $\theta_1$ is the Doppler offset produced in the single carrier signal transmitted by the slave at its receipt by the transponder.

Continuing now with the description of operation of the circuitry, amplifiers 98 and 99 are tuned to the upper and lower transponder return signals, $\omega_1+1.5\omega_0$ and $\omega_1-0.5\omega_0$, respectively, corresponding to 515 mc. and 495 mc. Mixer 100 produces sum and difference frequencies with filter 101 being arranged to pass the signal sum frequency of $\omega_0+2[ \ldots ]+\beta_1+\beta_2$ to mixer 102, the $\omega_1$ being taken out by $\omega_1'$ term applied to mixer 100.

Filter 103 passes the difference signal frequency resulting from the action of the next mixer 102, thereby eliminating the transponder $\omega_0$ frequency, with twice the sum of the various Doppler frequencies accordingly being applied to the velocity readout 104. The frequency reading given thereby, as will be understood, will include both the slant range velocity from slave 66 to the transponder and the master to transponder slant range velocity produced in the master signal as it initially enters the transponder on its way to the slave station. The actual slant range velocity of the target vehicle relative to the slave station may be acquired from the reading, however, by computational procedures, since the target-to-master velocity information is available from readout 41 in FIGURE 1 and hence can be effectively eliminated from the reading given by readout 104.

Frequency detector 105, which may be tuned to an $\omega_1 - 0.5\omega_0$, or 495-mc. point, will produce the series of data range signals whose phase shifts relative to the originally produced signals by generator 10 reflect twice the sum of the slant range of the master station to the transponder and the slant range of the transponder to the slave station. The range data signals are passed into servo readout 106 for the previously mentioned phase comparison procedure with subsequent distance determination. It will also be appreciated that additional computation will be required to remove the master-station-to-vehicle distance information from the servo readout distance reading obtained in order to acquire the actual transponder-to-slave 66 slant range.

As before, low-pass filter 107 will act to filter out all of the range data signals and pass a D.-C. signal corresponding to the Doppler offset terms, $[\ldots] + \beta_2$. The polarity of this signal will establish the sign or direction of the frequency shift, hence the sign or direction of the slant range velocity to go with the magnitude reading given by velocity readout 104. As before, the sign thus indicated is determined by the sum of the various Doppler frequency shifts and computation will be required to separate out the slave-to-transponder slant range velocity sign from the other terms.

Another receiver is partially shown at 110 and is employed for producing output slant range position and slant range velocity information of the transponder as received from the other slave station 67 via the transponder. As will be recalled, slave station 67 transmits $$\omega_1 + \tfrac{1}{4}\omega_0 + [\ldots]$$

by having switch 88 thrown, in FIGURE 4, to its lower switch point, and transponder 20 will serve, in response to this frequency, to produce basic carrier sum and difference signals of $\omega_1 + 1.25\omega_0$ and $\omega_1 - .75\omega_0$ in frequency, respectively, as indicated in FIGURE 5. Accordingly, amplifiers 112 and 113 are center-tuned to these frequencies, or 512.5 mc. and 492.75 mc., respectively. As is also indicated in the figure, these upper and lower carrier return signals undergo respective Doppler frequency shifts of $\gamma_1$ and $\gamma_2$. In all other respects, then, readout unit 110 will be similar to slave readout unit 96 and will furnish output slant range velocity and position information based on both the master-to-transponder velocity and distance and the transponder-to-slave 67 velocity and position.

The FIGURE 5 system incorporates several inherent advantages over the system detailed in the prior-noted application for patent, Serial No. 737,446. First of all, all range and velocity information is determined at the master station, hence making real-time computation of the target spatial coordinate position readily possible. As will be recalled in the earlier described system, slant range information to the transponder was determined separately at the master and each slave station, with the result that external communication links would be needed for bringing all slant range information together, as would be required for determining target location in real time.

Another advantage possessed by the present system over the earlier-noted system is the fact that readout information from the master and each slave is being continuously rather than sequentially derived. This characteristic simplifies the servo readout requirements in that no memory of the preceding sequenced information is required over the dead intervals, that is between the intervals of active data receipt. Then, too, another type of difficulty inherent in sequencing techniques is avoided by the present system. This difficulty occurs when, under extreme conditions, the target vehicle is positioned very close to one station and at a maximum distance from another station, with the result that the greatly differing transit times of the interrogating signals from the two stations may cause them to overlap timewise, with resulting indeterminate and erroneous readout information.

Figure 6:
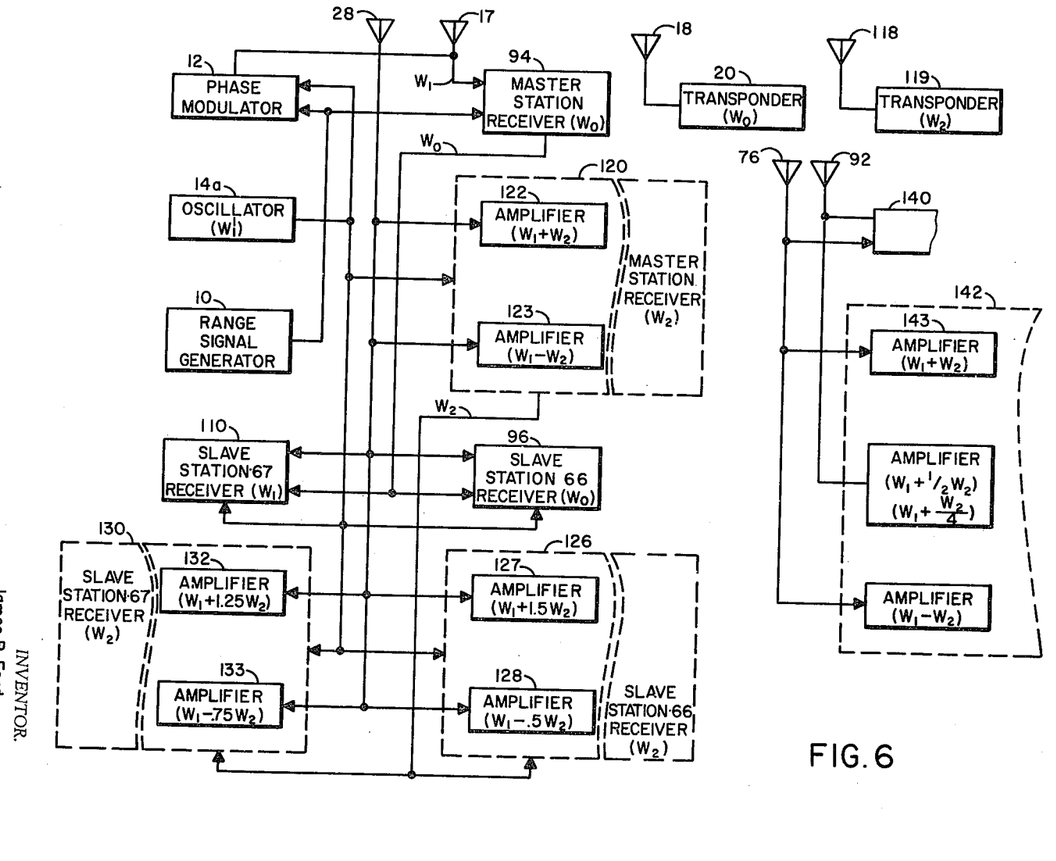
FIGURE 6 is a block diagrammatic representation, with some blocks shown broken away, for illustrating the extension of the FIGURE 5 system for including a pair of transponder-carrying vehicles.

In FIGURE 6 is shown an extension of the FIGURES 4 and 5 system for including multi-target tracking capabilities. Accordingly, there is shown an additional transponder 119 and associated antenna 118, which may be similar in all respects to transponder 20 and antenna 18 shown in detail in FIGURE 1, except that the transponder oscillator produces an output signal frequency of $\omega_2$, instead of $\omega_0$.

The typical slave station, shown earlier in FIGURE 4, requires modification for handling the transponder 119 signal. Accordingly, block 140 represents the FIGURE 4 slave station circuitry and, in addition, includes an identical unit 142, whose pair of input amplifiers 143 and 144 are tuned to pass $\omega_1 + \omega_2$ and $\omega_1 - \omega_2$ signal frequencies, respectively, which result from the mixing of the transponder 119 $\omega_2$ produced signal with the ground-received $\omega_1$ carrier signal. A modified output amplifier is shown at 146 within slave unit 142 which, for the slave station corresponding to station 66 in FIGURES 3 and 4, will be tuned to an $\omega_1 + \tfrac{1}{2}\omega_2$ output frequency and will, for the slave station corresponding to station 67, be tuned to $$\omega_1 + \frac{\omega_2}{4}$$

Thus, the only modifications required in each of the slave stations, as earlier set forth in FIGURE 4, are indicated in the added unit 142. In operation, the additional output signal from each slave station will be received by transponder 119, mixed with $\omega_2$, and the resulting upper and lower carrier signal frequencies retransmitted to the master station.

An additional master station receiver 120, partially illustrated, is employed for furnishing readout information of the transponder 119 slant range position and velocity and will be similar in all respects to master station receiver 94, except that its pair of associated amplifiers 122 and 123 are tuned to the upper and lower transponder 119 returned carrier signal frequencies of $\omega_1 + \omega_2$ and $\omega_1 - \omega_2$. Also, receiver 120 will produce an output signal, $\omega_2$, in the same way that receiver 94 produced the $\omega_0$ signal. An additional slave station 66 receiver 126 is illustrated, as associated with the master station, which serves to produce output slant range and slant range velocity data for the transponder 119 data retransmitted from slave unit 142 corresponding to station 66. Accordingly, its pair of respective tuned amplifiers 127 and 128 are tuned to upper and lower received carrier signal frequencies of $\omega_1 + 1.5\omega_2$ and $\omega_1 - 0.5\omega_2$, respectively. This receiver will be similar in all respects to receiver 96, except for the tuning of its input amplifiers to correspond to the transponder 119 slave 66 signals and its receipt of the $\omega_2$ signal produced by receiver 120.

Finally, an additional slave station 67 receiver 130, for determining slant range position and velocity information of transponder 119 from station 67, is shown, and includes a pair of amplifiers 132 and 133, tuned to respective $\omega_1 + 1.25\omega_2$ and $\omega_1 - 0.75\omega_2$ signal frequencies. Receiver 130 also receives the $\omega_2$ signal produced by master station receiver 120, and will, in the manner shown in detail for receiver 96, furnish the velocity and position data of transponder 119 from the slave station 67 location.

The techniques of the present invention, as described, may be readily extended for providing additional system tracking capabilities, as will be apparent to those skilled in the art. For example, additional transponders, other than the two shown in FIGURE 6, could be employed where their local oscillator frequencies would differ from each other and the earlier $\omega_0$ and $\omega_1$ transponder frequencies. The slave stations would accordingly require additional receivers for each additional transponder, which would produce single output signals in the manner shown for the additional FIGURE 6 transponder. Three additional receivers would then be required at the master station for each added transponder, for handling the master station's and the two returned slave signals.

In the same way, additional slave stations, other than the two slave stations shown in FIGURE 3, may also be employed in accordance with the present invention for providing back-up range and velocity information or for achieving greater distance or area tracking capabilities. Each additional slave station, continuing the FIGURE 4 technique, would transmit a carrier signal whose frequency differs from the received transponder signal by different fractional amounts of $\omega_0$, than ½ or ¼, as shown in the figure. The master station, in turn, would require an additional receiver for each of the added slave stations. Finally, additional slave stations and additional transponders could be simultaneously added to the system in the manners described separately above for achieving even greater system capabilities.

What is claimed is:

1. An electronic system for acquiring information on the slant range velocity of a moving target vehicle, said system comprising: ground-based means for transmitting a first carrier signal of a first frequency to said target vehicle; first means on said target vehicle for receiving said first carrier signal, said received first carrier signal having a modified first frequency due to the slant range velocity of said target vehicle; second means on said target vehicle for transmitting second and third carrier signals of second and third frequencies, respectively, said second and third frequencies differing above and below, respectively, said modified first carrier signal in frequency by a fourth frequency; ground-based receiving means for receiving said second and third carrier signals at modified second and third frequencies, respectively, due to the slant range velocity of said target vehicle; mixing means for mixing said first carrier signal with each of said modified second and third carrier signals; means for extracting said fourth and said modified frequencies from each of the mixing operations performed by said mixing means; means for mixing the signals produced by the last-named means to produce sum and difference signal frequencies, said difference signal frequency representing the slant range velocity of said moving target vehicle; and means for indicating the frequency of said difference signal frequency produced by said last-named means.

2. An electronic system for acquiring slant range velocity information of a moving target vehicle, said system comprising: means for generating a first signal of a first frequency; means for transmitting said first signal; transponder means in said target vehicle responsive to the receipt of said first signal for producing and transmitting second and third signals whose frequencies differ above and below the received frequency of said first signal, respectively, by a second frequency; receiver means for receiving said second and third signals, the frequencies of said received second and third signals being offset from exactly above and below, respectively, said first frequency by said second frequency owing to Doppler effects caused by the transponder slant range velocity; signal mixing means responsive to said first signal and said received second and third signals for producing a fourth signal whose frequency corresponds to the frequency offset from the exact frequency difference between said first and said received second and third signals, and hence the slant range velocity of said target vehicle; frequency sensitive means for indicating the frequency of said fourth signal, said indication representing the slant range velocity of said target vehicle; signal responsive means responsive to one of said received second and third signals for producing a D.-C. signal whose polarity represents the direction of frequency offset of said one received signal from said first signal and hence the sign of the velocity represented by the frequency of said fourth signal; and means for indicating the polarity of said D.-C. signal, said indication representing the sign of said slant range velocity.

3. The electronic system according to claim 2 wherein said transponder means includes transponder signal generating means producing a signal having said second frequency and transponder mixing means for mixing said received first signal with the signal produced by said signal generating means whereby said second and third signals represent the sum and difference signal products resulting from the action of said transponder mixing means.

4. The electronic system according to claim 3 wherein said signal mixing means includes first and second mixing means, means for applying said first and said received second signals to said first mixing means to produce an output signal corresponding to said second frequency modified by said frequency offset, means for applying said first and said received third signals to said second mixing means to produce an output signal corresponding to said second frequency modified by said frequency offset, third mixing means, and means for applying the output signals produced by said first and said second mixing means to said third mixing means to produce said fourth signal.

5. The electronic system according to claim 4 wherein said signal responsive means includes detection means, means for applying the output signal of one of said first and second mixing means in said signal mixing means to said detection means whereby the D.-C. signal is produced by said detection means.

6. The electronic system according to claim 5 wherein the first-named means includes, in addition, frequency varying means for varying said first frequency.

7. An electronic system for acquiring slant range velocity information of a moving target vehicle, said system comprising: means for generating a first carrier signal of a first frequency; signal generating means for generating a series of range signals; means for modulating said series of range signals on said first carrier signal; means for transmitting said modulated first carrier signal; transponder means in said target vehicle responsive to the receipt of said first modulated carrier signal for producing and transmitting second and third modulated carrier signals whose frequencies differ above and below the received carrier frequency of said first signal, respectively, by a second frequency; receiver means for receiving said second and third modulated signals, the carrier frequencies of said received second and third signals being frequency offset from exactly above and below, respectively, said first carrier signal frequency by said second frequency owing to Doppler effects caused by the transponder slant range velocity; signal mixing means responsive to said first carrier signal, said received second carrier signal and said received third carrier signals for producing a fourth signal whose frequency corresponds to the frequency offset from the exact frequency difference between said first and said received second and third carrier signals and hence the slant range velocity of said target vehicle; frequency sensitive means for indicating the frequency of said fourth signal; signal responsive means responsive to one of said received second and third signals for producing a D.-C. signal whose polarity represents the direction of frequency offset of said one received signal from said first signal and hence the sign of the velocity represented by the frequency of said fourth signal; means for indicating the polarity of said D.-C. signal, said indication representing the sign of said slant range velocity; detector means for detecting the series of range signals in said received modulated second carrier signal, the series of detected range signals being phase delayed from the series of range signals produced by said signal generating means an amount corresponding to the slant range of said target vehicle; and servo readout means responsive to the phase difference between said series of range signals and said series of detected range signals for producing an indication of the slant range to said target vehicle.

8. In combination: first means at a first point for transmitting a first signal of a frequency $\omega_1$; transponder means for receiving said first signal and transmitting second and third signals having nominal frequencies of $\omega_1+\omega_0$ and $\omega_1-\omega_0$ but offset therefrom due to relative motion between said first means and said transponder means; slave means for receiving the second and third signals transmitted by said transponder means, said slave means including mixing means for mixing the received second and third signals to produce sum and difference frequencies thereof, means for extracting from the sum and difference frequencies produced by said mixing means a fourth signal having a nominal frequency of $2\omega_1$ and a fifth signal having a frequency $2\omega_0$, means for dividing the frequency of said fourth signal by two to form a sixth signal having a nominal frequency $\omega_1$, means for dividing said fifth signal at least four times to form a seventh signal having a frequency of $$\frac{\omega_0}{2}$$

means for mixing said sixth and seventh signals to produce an eighth signal having a nominal frequency of $$\omega_1+\frac{\omega_0}{2}$$

and means for transmitting said eighth signal; said transponder means receiving said eighth signal and retransmitting ninth and tenth signal having nominal frequencies of $\omega_1+1.5\omega_0$ and $\omega_1-.5\omega_0$; means for receiving said ninth and tenth signals retransmitted by said transponder means at said first point, the frequencies of said ninth and tenth carrier signals being offset from their nominal values of $\omega_1+1.5\omega_0$ and $\omega_1-.5\omega_0$ due to relative motion effects between said first means and said transponder means and said slave and said transponder means; means for mixing said received ninth and tenth carrier signals to produce an eleventh signal having a nominal frequency of $\omega_0$; means at said first point for producing a twelfth signal having a frequency exactly equal to $\omega_0$, means for mixing said eleventh and twelfth signals to produce a thirteenth signal whose frequency corresponds to their frequency difference, said difference frequency corresponding to the relative motions between said first point, said transponder and said slave means; and means for producing an output indication of the frequency of said thirteenth signal.

9. The combination according to claim 8 including, in addition, slant range determining means at said first point, said slant range determining means including means for generating a series of range signals of increasingly longer wavelengths, means for modulating said series of range signals on said first signal whereby said series of modulated ranging signals are remodulated on said second and third signals transmitted by said transponder means, and are remodulated by said slave means on said eighth signal and again remodulated by said transponder means on said ninth and tenth signals, means at said first point for demodulating one of said ninth or tenth signals to derive said series of range signals whose composite phase shifts relative to the range signals produced by said range signal generating means represent slant range information between said first point, said transponder and said slave means, and servo readout means responsive to the series of range signals produced by said range signal generating means and said demodulated series of range signals for producing output slant range information between said first point, said transponder and said slave means.

References Cited in the file of this patent

UNITED STATES PATENTS

| | | |
|---|---|---|
| 1,750,668 | Green | Mar. 18, 1930 |
| 2,134,716 | Gunn | Nov. 1, 1938 |
| 2,654,884 | Palmer | Oct. 6, 1953 |
| 2,695,404 | Barker | Nov. 23, 1954 |
| 2,705,320 | Palmer | Mar. 29, 1955 |
| 2,939,132 | Tollefson | May 31, 1960 |